United States Patent [19]
O'Connor

[11] 3,850,395
[45] Nov. 26, 1974

[54] ACTUATOR CONTROLLED INSTRUMENT SUPPORT STAND

[76] Inventor: Chadwell O'Connor, 2024 Galaxy Dr., Newport Beach, Calif. 92660

[22] Filed: Oct. 15, 1973

[21] Appl. No.: 406,542

[52] U.S. Cl.............................. 248/171, 248/188.3
[51] Int. Cl........................................... F16m 11/38
[58] Field of Search .......... 248/407, 408, 411, 412, 248/168–171, 188.2, 188.3, 188.6, 354 H

[56] References Cited
UNITED STATES PATENTS

| | | | |
|---|---|---|---|
| 2,361,781 | 10/1944 | Lindsey et al. | 248/171 |
| 2,908,472 | 10/1959 | McDonald | 248/188.3 |
| 3,722,847 | 3/1973 | O'Connor | 248/407 |
| 3,795,378 | 3/1974 | Clarke | 248/168 |

Primary Examiner—Paul R. Gilliam
Assistant Examiner—Kenneth J. Dorner
Attorney, Agent, or Firm—Wolfe, Hubbard, Leydig, Voit & Osann, Ltd.

[57] ABSTRACT

An improved instrument support structure including a post telescoped in a column, with means for adjusting their combined length, and three legs pivoted at the bottom of a column for swinging movement from adjacent the column to extended, base defining positions. The legs are locked by extendable struts including fluid actuators with one strut interconnecting each leg with the column. Fluid from a reservoir on the column is directed to all actuators when the legs are extended, and then valving is closed to shut off fluid intercommunication and lock the legs. The valving further includes provision for permitting one of the leg actuators to be manually pumped for drawing fluid from the reservoir and forcing fluid into the other leg actuators for easy setup of the structure. The valve also includes manual control for selectively setting the different valve positions and detent button means permits free rotation of the valve control in one direction while imparting a positive feel of the various settings and normally prevents rotation of the control in the other direction, but may be overridden by manually depressing the button.

5 Claims, 11 Drawing Figures

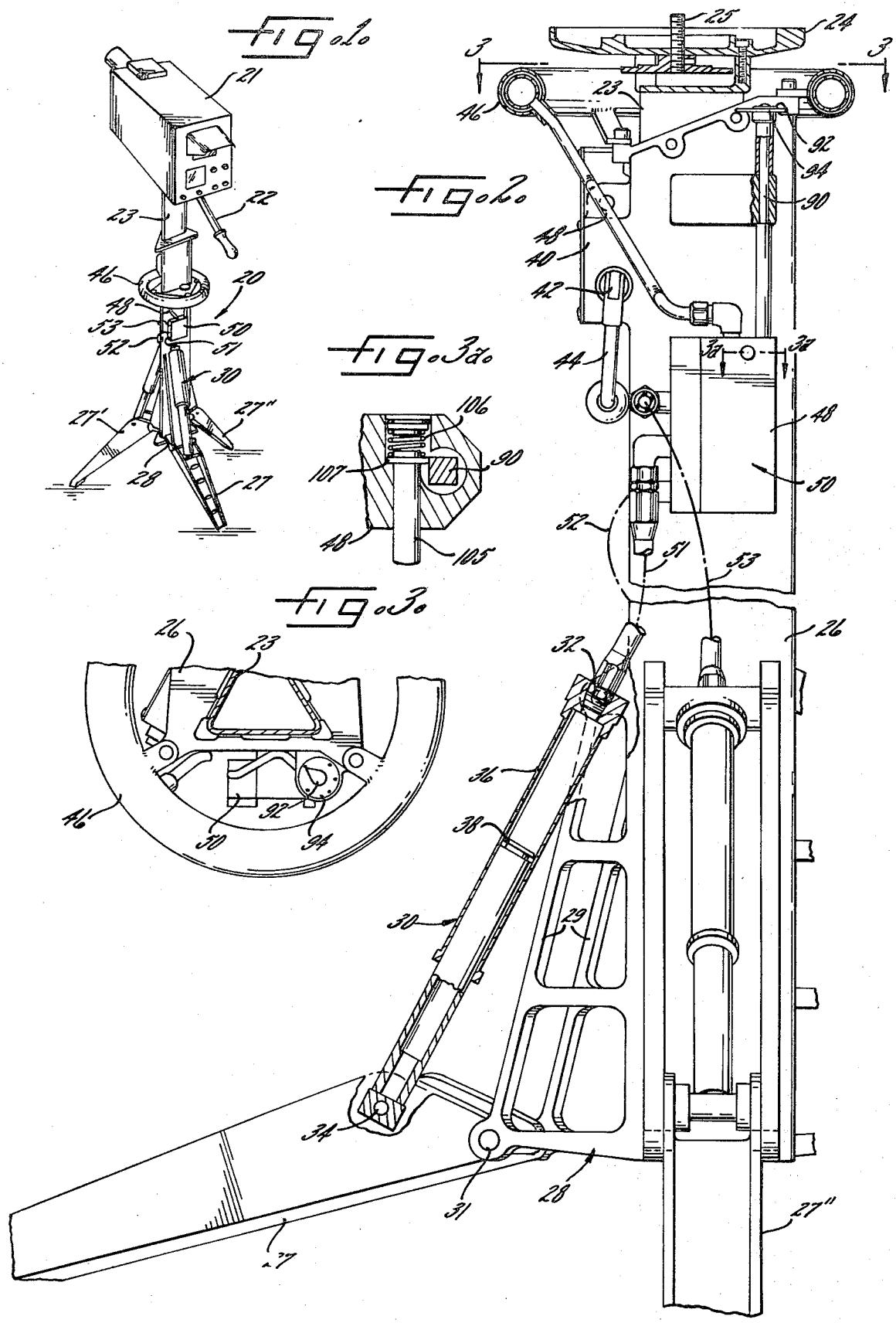

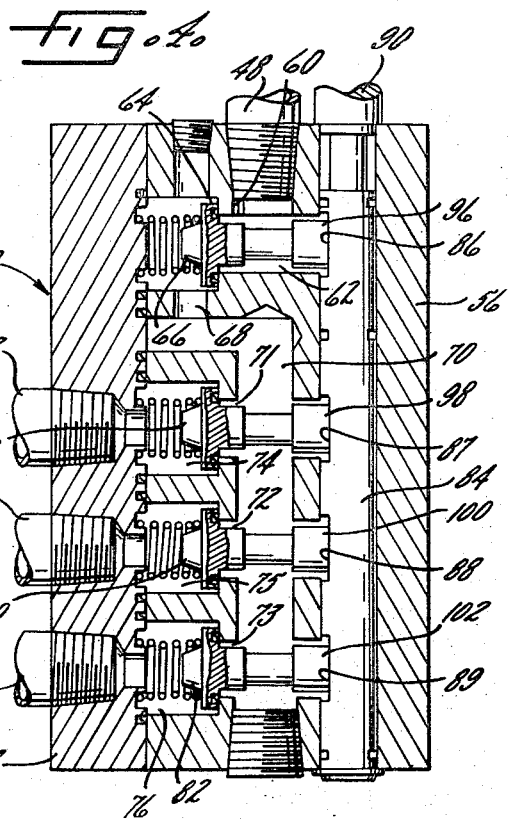

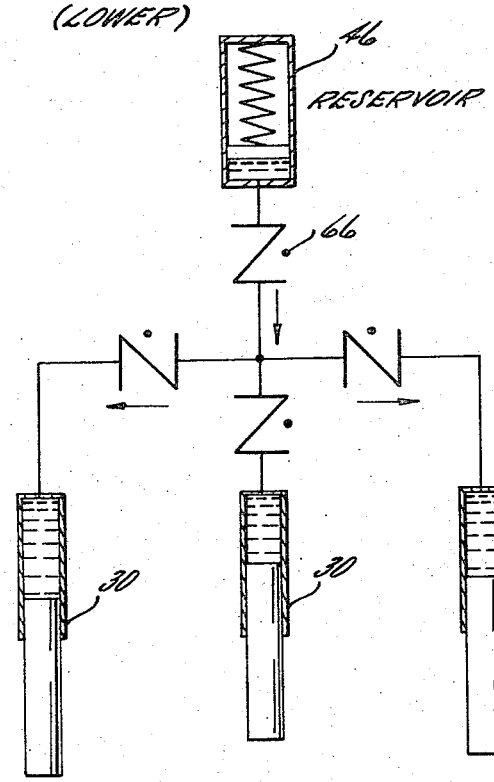
Fig. 7. (LOWER)
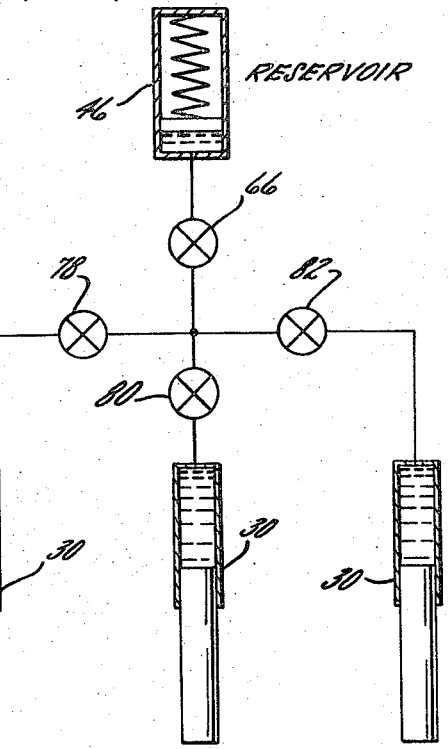
Fig. 8. (LOCK)
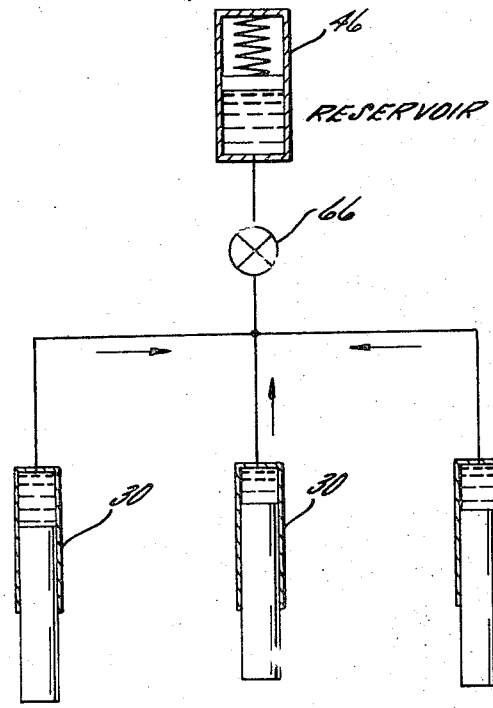
Fig. 9. (LEVEL)
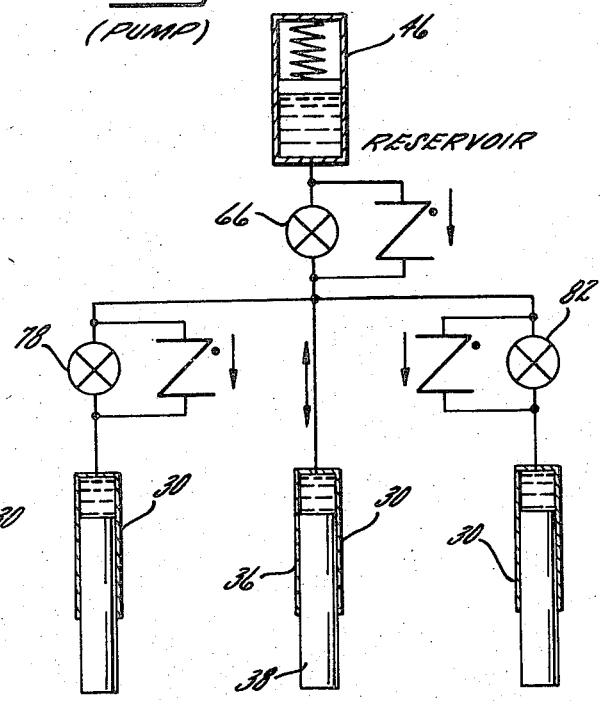
Fig. 10. (PUMP)

ACTUATOR CONTROLLED INSTRUMENT SUPPORT STAND

BACKGROUND OF THE INVENTION

The present invention relates generally to support positively controlled for instruments such as cameras, transits and the like, and concerns more particularly a portable instrument support stand including positivelycontrolled actuation for setting up the collapsible legs in their base defining positions.

There is disclosed and claimed in Chadwell O'Connor U.S. Pat. No. 3,722,847 issued Mar. 27, 1973, an instrument support structure adapted to collapse compactly which includes a telescoping column and three legs pivoted at the bottom of the column for swinging movement from adjacent the column to extended, base-defining position. The legs which are pivotally connected to the column are also interconnected with extendable struts carrying fluid actuators supplied through a valve with fluid from a reservoir carried by the column. The valve may be selectively set to (1) open the reservoir to all of the actuators allowing the struts to extend and the legs pivot to their base defining positions, (2) shutting off the reservoir while allowing fluid communication between the actuators so that automatic simultaneous adjustment of the legs occurs while repositioning, and (3) shutting off all intercommunication of fluid between the individual actuators and the reservoir so as to lock the struts at given lengths and thus lock the legs in given positions.

While the general arrangement for the instrument support structure of the aforementioned patent is totally satisfactory and does constitute a substantial improvement over other types of conventional tripods, nevertheless certain disadvantages are incurred in setting up the stand particularly when a heavy instrument such as a television camera has been mounted to the stand due to the manipulative steps needed to individually unfold the legs and the awkwardness of balancing and supporting the reservoir when of the camera at the opposite end of the stand while working at the opposite end. Simply permitting the legs to freely fall by allowing fluid to rush into the actuators from the reservoirwhen the legs are released from the over-center collapsed position can be hazardous especially where the legs themselves are relatively heavy members.

OBJECTS OF THE INVENTION

Accordingly, it is a general aim of the present invention to provide an improved instrument support which overcomes the foregoing disadvantages and which is characterized by permitting positive controlled actuation to unfold the legs for set up.

A further object is to provide a stand as characterized above that allows the user to more easily uncollapse the legs so as to minimize the manipulative steps required for placing the stand in a self supportable position even where the stand has already been attached to a relatively heavy instrument.

Still another object, though more specific, is to provide a stand of the foregoing type wherein one of the legs may be utilized to positively pump fluid from the reservoir into the fluid actuators of the other legs to set up the stand. In this connection it is a more specific object of the invention to provide a selective valve arrangement which is yet more versatile than the valve arrangement of the aforementioned O'Connor patent and includes a position for permitting one of the legs to be used as a pump actuator.

Other objects and advantages of the invention will become apparent upon reading the following detailed description and upon reference to the drawings.

DESCRIPTION OF THE DRAWINGS

FIG. 1 is a perspective of a support stand embodying the invention and here shown mounting a television camera;

FIG. 2 is an enlarged partial section of the support stand illustrated in FIG. 1;

FIG. 3 is a fragmentary section view taken approximately along the line 3—3 in FIG. 2;

FIG. 3a is an enlarged section taken approximately along the line 3a—3a in FIG. 2;

FIG. 4 is an enlarged sectional view of the valve construction for use with the apparatus of FIG. 1;

FIG. 5 is a schematic chart showing of the valve cam positions for each of the operative setting selections of the valve control; and FIGS. 6, 7, 8, 9 and 10 are schematic showings of the fluid connections for the reservoir and actuators with each of the selective valve positions available in the respective order showing fold, lower, lock, level and pump settings.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

DESCRIPTION OF THE INVENTION

Referring in FIG. 1, there is shown an instrument stand generally indicated at 20, embodying the invention and mounting, for the purpose of illustration, a camera 21 on a pan head 22. The stand 20 includes a post 23, with an upper plate 24 (FIG. 2) and a mounting screw 25 permitting attachment to the pan head 22, that is slidably fitted in a column 26. Pivotally connected at the lower end of the column 26 are a plurality of legs 27, 27' and 27'' (there being three in number), the arrangement being such that the legs swing between positions adjacent the column 26 and positions extending from the column and defining a base for supporting the structure 20. For further details of the arrangement of the legs and column, reference is made to the aforesaid O'Connor U.S. Pat. No. 3,722,847.

In brief, the column 26 is preferably triangular in cross-section and the three legs 27, 27' and 27'' are pivoted on brace members 28 integrally formed with the column 26. Referring to FIG. 2, the braces 28 are also generally triangular shaped and include spaced apart webs 29 having aligned pivot openings at the outermost ends to receive a pin 31 which passes through an opening the leg 27. A plurality of struts 30 including fluid actuators, one for each leg, are connected between an upper pivot point 32 on the braces 28 and respective pivot points 34 on the legs 27. The fluid actuators include cylinder portions 36 and piston portions 38 (FIG. 2). The legs 27 are open in cross-section so as to encase the actuator struts 30 when the legs pivot against the flat sides of the column 26. In addition, the legs when pivoted against the flat sides of the column 26 pass between the webs of the braces 28.

In order to facilitate adjustment of the post 32 with respect to the column 26, a gear train arrangement (not shown) is carried in a protruding casing portion 40 (FIG. 2) formed with column 26 and a drive shaft 42 projecting outwardly from the casing 40 pivotally receives a crank handle 44. It will be appreciated by those skilled in the art, that the drive gear of the gear train engages with a rack carried by the post 23 so that rotation of the crank handle 44 elevates and lowers the post with sufficient mechanical advantage being provided for handling a relatively heavy instrument carried by the upper plate 24.

In keeping with the general arrangement of the stand structure, a fluid reservoir 46 in the shape of an annulus is mounted on the column 26 with a fluid supply line 48 connecting the reservoir through valve 50 and fluid lines 51, 52, 53 to respective actuators 30 of legs 27, 27' and 27''. In the preferable form, the reservoir includes a resilient or rubber-like donut member fitted within an outer chamber so that the contained fluid is under slight pressure, when the legs 27 are collapsed up against the sides of the column 26, and the struts 30 over-center the leg pivot axis thereby permitting the slight reservoir pressure to hold the legs against the column.

In accordance with the present invention, means including valve 50 are provided for selectively (1) regulating the opening of the fluid supply line from the reservoir to all of the actuators for controlled opening and generally free collapse of the legs, (2) closing the supply line of the reservoir while allowing intercommunication of fluid between the actuators for leveling adjustments of the legs, (3) shutting off intercommunication of fluid between the individual actuators and the reservoir to lock the actuators at given lengths and thus lock the legs in given positions, and (4) permitting one of legs through its actuator to be operated as a pump to positively draw fluid from the reservoir and force the fluid to the actuators of the other legs for easy set up of the instrument stand.

Referring to FIG. 4 the valve 50, includes a body 56 and a head 58 sealingly attached to the body. An inlet opening 60 in the body receives the fluid supply line 48 from the reservoir 46. The inlet opening 60 communicates with a transverse port 62 having a valve seat 64 against which spring biased valve member 66 acts to seal and unseal the port 62. The outlet side of port 62 is connected by a passage opening 68 to a generally L-shaped passage 70 which communicates with seat openings 71, 72, 73 to respective outlet chamber 74, 75, 76. Disposed in each outlet chamber 74, 75, 76 is a respective spring biased valve member 78, 80, 82 to open and close its particular chamber with respect to the passage 70.

In the instant arrangement, outlet chambers 74, 75, 76 are respectively connected to actuator supply lines 52, 51, 53.

For controlling the opening and closing of the valves a longitudinally extending rotatable cam shaft 84 is provided including a plurality of cam faces 86, 87, 88, and 89 disposed about the periphery of the shaft. The cam shaft 84 is rotatably set through an upwardly projecting stem 90 that receives a knob 92 for manual positioning with respect to an indicator disk 94 (FIGS. 2 and 3).

Referring again to FIG. 4, each valve member 66, 78, 80, 82 includes a respective follower 96, 98, 100, 102 cooperating with their particular cam faces 86, 87, 88, 89.

Referring to FIG. 5 there is a diagrammatic representation of the various cam face settings to illustrate the different selectable functions attainable through the valve 50. Thus, in the illustrative arrangement the control knob 92 is provided with six angular position settings with a corresponding number of cam faces 86, 87, 88, and 89. Taking the first control knob position which has been designated the 0° or "fold" position, here the cam surfaces are such that all of the followers 96, 98, 100 and 102 are urged fully to the left as viewed in FIG. 4 so that all the respective valves 66, 78, 80, 82 are in the "full" open positions. Thus, fluid may freely flow between the reservoir supply line 48 and the actuator lines 51, 52, 53 particularly when the legs are to be folded or collapsed since in this instance the fluid would be driven from the actuators back into the reservoir (FIG. 6).

In the second column designated 45° or "lower" of the FIG. 5 diagram there is shown cam positions where upon rotation of the control knob 92 to the 45° angular position new cam faces are presented to allow the cam followers 96, 98, 100 and 102 with their respective valves 66, 78, 80, 82 to move to the right as viewed in FIG. 4 so that all of the valves are in a half open position with respect to their seats. This allows the legs to be lowered at a controlled rate without "falling" because of a rush of fluid to or from the reservoir (FIG. 7).

In keeping with an important aspect of the present invention, there is shown in the third column a 90° position for the control knob 92 that is designated "pump" wherein the cam face 86 controlling the follower 96 of the reservoir inlet valve 66 permits the valve to be seated, normally closing-off the fluid from the supply line 48. Similarly, cam faces 87 and 89 to two of the actuator cylinders permit their cam followers 98, 102 to be moved to the extreme right as viewed in FIG. 4 so that valves 78, 82 are also seated. Cam face 88, however, holds follower 100 to the left keeping valve 80 off of its seat so that there is some fluid communication through line 51 to the valve passage 70.

In this instance as diagrammatically indicated in FIG. 10, the middle actuator cylinder for leg 27 is operable as a pump in that manually pulling the leg 27 downwardly moves the piston 38 downwardly creating a suction in the fluid line through open valve 80 and passageway 70 (FIG. 4) which draws valve member 66 away from its seat drawing more fluid from the reservoir into the pump cylinder. Moving the leg 27 upwardly then pushes the fluid out through open valve 80 into passage 70 which causes valve member 66 to again seat thereby preventing the fluid from flowing back into the reservoir while at the same time unseating valve members 78 and 82 forcing the fluid into the other actuator cylinders 30 for legs 27' and 27''. Repeated pumping actions on leg 27 continues the fluid action and valve movement described to forcibly move the actuator cylinder pistons 36 for the other legs downwardly until they reach the desired position and pumping is discontinued.

Rotation of the control knob 92 to the 180° position for that designated "level" (FIG. 5) brings new cam faces 86, 87, 88, 89 in position so that the valve 66 is closed to shut off the reservoir, but intercommunication between the actuator cylinders for all three legs occurs since valves 78, 80 and 82 are all held open. In this situation as shown diagrammatically in FIG. 9, the relative positions of the legs may be varied to level the structure 20 on uneven or sloping ground as well as in different vertical heights, but the adjustment of the legs will be automatic since the column is being positioned with fluid intercommunication between all of the actuator cylinders.

At this point, the control knob 92 may be moved clockwise to the 270° position or that designated "lock" wherein all the cam faces 86—89 permit the cam followers to move to the extreme right and all the valves are closed (FIG. 4). As illustrated diagrammatically in FIG. 8, with all the valves closed the actuator cylinders are shut-off from one another and the legs 27, 27', 27" are locked in their adjusted positions.

In the preferred embodiment, provision is made for permitting the control knob 92 and stem 90 operating cam shaft 84 to be freely rotated in the clockwise position, but with a "feel" or detent action as each of the selectable angular positions is reached. Also, the arrangement is such that an override must be manually operated to rotate the control knob 92 in the counterclockwise direction.

In keeping with this aspect of the invention, referring to FIGS. 3 and 3a conjointly, the valve body 48 carries an outwardly projecting detent button 105 normally urged outwardly by a spring 106. Adjacent the inner end of the button 105 is a peripheral flange 107 that bears against the square cross-section of stem 90 adjacent the flange. As shown in FIG. 3a, rotation of the stem 90 in the clockwise direction will bear against the flange 107 and draw the button 105 inwardly against the spring permitting free rotation of the stem and cam shaft 84 extending in the valve body. Rotation of the stem 90 in the counterclockwise direction is normally prevented by flange 107 unless the button 105 is depressed moving the flange 107 away from the flat sides of the stem 90.

It will be appreciated that when the stem 90 is rotated in the clockwise direction due to the square configuration of stem 90 reaction pressure is released at each 90° angular position providing a "feel" to the user that one of the main positions of "fold," "pump," "level" or "lock" has been set. Each setting is positive in the sense that counterclockwise movement is prevented without depressing the button 105 and continued movement of the knob 92 in the clockwise direction is again against a build up reaction force from moving the button 105 against the spring 106 pressure. While the square cross-sectional shape of the stem provides for only four main settings, other polygonal shaped cross sections may be used to obtain desired numbers of positive settings.

As another feature of the present invention, provision is made for permitting release of pressure on the cylinder side of one valve to equalize the pressures on the valves and making it easier to rotate the cam shaft when taking the instrument off the lock setting where all of the valves have been closed.

In this regard, referring to FIG. 5 there is shown the "release" setting at 240° where the cam faces 86, 87 and 89 permit their respective followers 96, 98 and 102 to remain to the extreme right as viewed in FIG. 4 leaving the valve members associated therewith closed while cam face 88 moves follower 100 to the left partially opening valve 80 about half way. This action is sufficient to equalize the pressures on both sides of all of the actuator cylinder valves and the control knob 92 may be more easily turned in the counterclockwise direction while depressing the button 105 to position the control knob at the "level" setting or at the "fold" setting if the legs are to be collapsed.

While the illustrative valve arrangement has been shown with certain angular positions for the main settings of "fold," "pump," "level" and "lock" and a particular one of the legs has been arranged to be the pump actuator, it will be appreciated that the cam faces may be arranged in other desired manners to have the particular settings in other angular positions or in other orders as well as using any of the other leg actuator cylinders as the pump lever.

I claim as my invention:

1. In an instrument support structure including, a column, a plurality of legs pivoted at the lower end of said column for swinging movement between positions adjacent the column to positions extending from the column to define a base for supporting the column upright, a plurality of struts including fluid actuators each connected between said column and one of said legs so as to define one extendable strut for each of the legs, a reservoir mounted on said column and containing fluid, means including a valve for selectively (1) opening said reservoir to all of said actuators so that, when so opened, the struts extend and the legs pivot to their base defining positions, (2) shutting off said reservoir while allowing intercommunication of fluid between the actuators, (3) shutting off intercommunication of fluid between the individual actuators so as to lock the struts at given lengths and thus lock the legs in given positions, the improvement comprising, said valve including additional selective means for permitting one of said leg actuators to be manually pumped for drawing fluid from said reservoir on the suction stroke and forcing fluid into the other actuators on the pressure stroke of said one leg actuator.

2. The combination as claimed in claim 1 wherein said valve means includes a valve body having inlet means connected to said reservoir, a plurality of outlets each connected to respective ones of said actuators, passageway means interconnecting said inlet to said outlets, cam operated valve members and closure seats for the inlet and each of said outlets, and cam shaft means having a plurality of cam faces adapted to selectively open and close respective ones of said valve members to establish said valve settings.

3. The combination as claimed in claim 2 wherein said cam shaft is rotatable and connected through a stem to a control knob and detent means associated with said stem for permitting rotation of said shaft in a preselected direction while normally preventing rotation in the opposite direction.

4. The combination as claimed in claim 3 wherein said detent means includes a spring biased button member having flange means at its inner end, and said cam shaft stem includes a polygonal cross-section portion adjacent said button flange means so that unidirectional rotation of said stem urges said button flange means out of the way to permit rotation with said button flange means returning at each flat side of said polygonal cross-section thereby imparting a positive feel of a valve setting.

5. The combination as claimed in claim 4 wherein said polygonal stem portion is square and said main valve settings are four in number.

* * * * *